May 22, 1962 R. P. ABRAHAM 3,036,224

LIMITER EMPLOYING OPERATIONAL AMPLIFIER HAVING NONLINEAR FEEDBACK CIRCUIT

Filed May 19, 1958

INVENTOR
R. P. ABRAHAM
BY
ATTORNEY

United States Patent Office 3,036,224

Patented May 22, 1962

3,036,224

LIMITER EMPLOYING OPERATIONAL AMPLIFIER HAVING NONLINEAR FEEDBACK CIRCUIT

Richard P. Abraham, New Providence, N.J., assignor to Bell Telephone Laboratories, Incorporated, New York, N.Y., a corporation of New York Filed May 19, 1958, Ser. No. 736,391
1 Claim. (Cl. 307—88.5)

Figure 1:
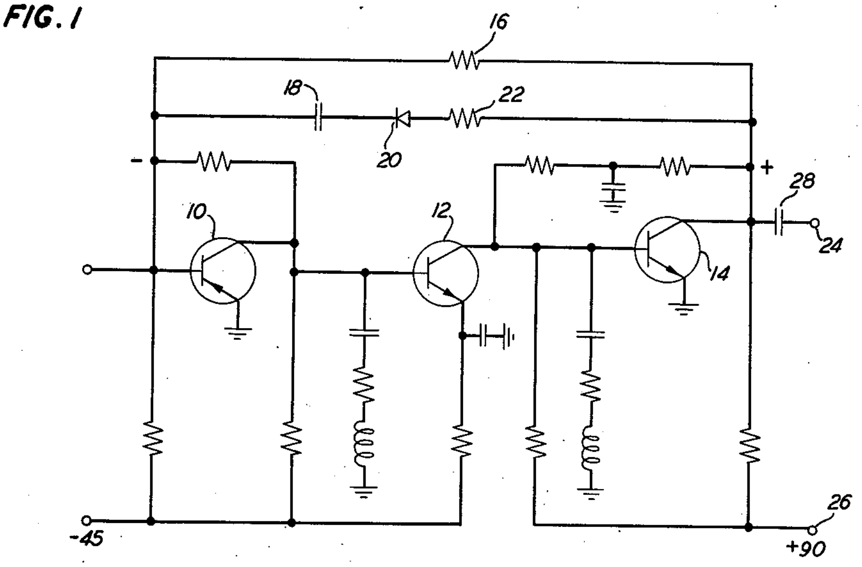

This invention relates in general to an amplifier of small phase shift and, in particular, to an amplifier for use in precision timing circuits which has a very small and substantially constant phase shift in a selected portion of the output waveform.

There are many instances where any phase shift between the output and input waveform of an amplifier is highly objectionable, especially where a portion of the output waveform is to be used in a precision timing circuit. Just such a requirement occurs in various timing and encoding systems wherein the electrical signal output is dependent upon the accurate determination of either the phase angle or time elapsed between corresponding points of two compared signal waveforms. If either or both of the waveforms to be compared are amplified by separate amplifiers, relative variations in the waveform position will be caused by the phase shift in the amplifier. Relative variations in the waveform position will also be caused by the noise in the output of the amplifier since the noise voltage will add or subtract from the amplified waveform, thus causing the waveform to reach a specified amplitude, such as zero axis crossing, sooner or later than otherwise.

It is, therefore, an object of this invention to improve amplifiers by reducing the relative phase shift between input and output signals to a small and constant value over at least a predetermined portion of the output waveform.

It is also an object of this invention to improve the precision of performance of clipping amplifiers.

It is usual in precision electrical timing circuits to measure time by determining the intervals between corresponding portions of two or more waveforms. The most convenient index for measurement involves the crossing of the axis by the waveform (referred to herein as the "zero axis crossing"). It follows that relative phase shift in any amplifier through which the waveform passes will impair the precision of measurement.

Although perhaps not so obvious, precision of measurement is also affected by random noise in the amplifier and associated circuits. Such noise causes the output waveform to reach a specified amplitude either sooner or later than it would otherwise. The commonly employed remedy for such difficulties is the use of a signal having a very large amplitude. This makes the slope at zero axis crossing greater, and thus might be expected to make the determination of the crossing point more precise and less sensitive to noise potentials. It is found in practice, however, that the use of such large amplitude signals overloads the amplifiers and that the resultant distortion destroys the hoped-for precision. According to the invention, the non-linear phase shift caused by amplifier overloading is minimized by very precise clipping of the unused portion of the waveform. Such very precise clipping is necessary since any change in the direct-current level of the output waveform which would be caused by a non-symmetrical waveform at the output introduces another obvious factor causing the specified amplitude of the output signal to be reached sooner or later in time.

According to the invention, there is provided a high gain amplifier with two negative feedback paths. The first feedback path provides a large amount of negative feedback $\beta$ to reduce the phase shift caused by the amplifier itself. The second feedback path comprises a capacitor and an avalanche breakdown diode in series. The capacitor has a discharge time at least several times greater than the period of the input waveform and, under steady state conditions, causes symmetrical limiting of the amplitude of the output waveform. Excursions of one polarity of the output waveform are limited by the avalanche breakdown region of the diode reverse conducting characteristics while excursions of the other polarity of the output waveform are limited by the forward conducting characteristics of the diode.

Figure 2:
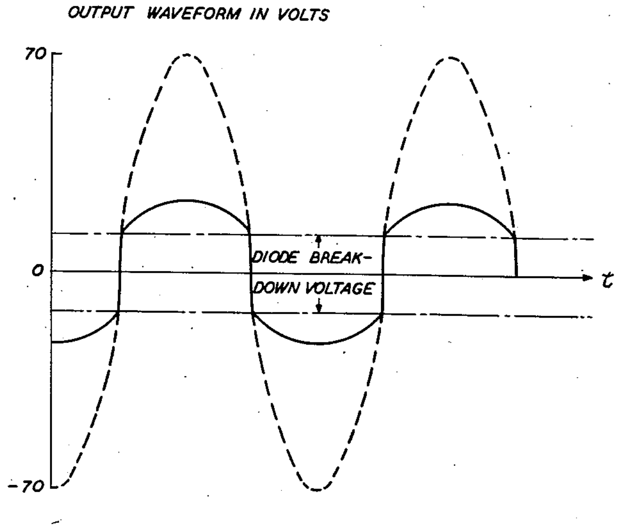

The invention is discussed in more detail hereinafter with reference to the accompanying drawing wherein:

FIG. 1 is a schematic diagram of a high gain, three-stage transistor amplifier with two feedback loops according to the invention; and FIG. 2 is an illustration of the steady state output waveform.

FIG. 1 is a schematic diagram of a high gain transistor amplifier which by way of example is shown as comprising a three-stage, direct-coupled common-emitter cascade; the first stage employs a P-N-P transistor 10 and the last two stages employ N-P-N transistors 12 and 14. The negative feedback paths consist of two parallel branches. One branch, comprising a resistor 16, determines the instantaneous gain of the amplifier for that portion of the output waveform which is not affected by the other of the two branches. Ordinarily this is the portion of the input signal about the zero axis.

The remaining or other branch of the feedback network comprises a capacitor 18, a current-limiting resistor 22, and a P-N junction diode 20, having an avalanche breakdown region in the reverse conduction characteristic, all in series. Diode 20 is a P-N junction diode having, in addition to the usual low resistance in the forward direction, a reverse conduction characteristic which includes both a region of high resistance for applied voltages below a critical value and a well-defined region of substantially constant voltage drop for applied voltages in excess of the critical value. Diodes of this type are described in the article of G. L. Pearson and B. Sawyer, "Silicon P-N Junction Alloy Diodes," appearing at page 1348 of the November 1952 issue of the proceedings of the I.R.E. The amplifier comprising transistors 10, 12 and 14 is direct coupled and may, as shown, utilize both shunt and series feedback within the three stages to stabilize the direct-current operating points.

In one of the contemplated uses of the invention the input waveform is a sine wave and the output waveform is applied to a circuit which generates a signal the instant that the output waveform passes through the zero axis with a positive slope. It is extremely critical, then, that this portion of the output waveform be identical in time position to the corresponding portion of the input waveform. The phase shift caused by the amplifier itself is reduced by the feedback loop comprising resistor 16. A large amount of feedback is utilized, in the order of $\beta=1000$. It is well known that this will decrease the open loop phase shift by approximately the same factor. Therefore, if the open loop phase shift varies $\pm 15$ degrees, the closed loop phase shift will remain within $\pm 1$ minute due to the feedback path comprising resistor 16.

The noise in the output of the amplifier, that is at terminals 24, 26, may be considered in the aggregate as causing some uncertainty in the position of the output pulse since the noise will add to or subtract from the output waveform so as to cause the output waveform to pass through the zero axis with a positive slope sooner or later in time. The greater the slope of the output waveform as it passes through the zero axis the less time the noise will have in which to act adversely, and consequently the less variation in the time the output waveform passes through the zero axis. However, a limit is reached as the voltage swing of the output is increased by increasing the gain since the amplifier will become overloaded. Amplifier overloading cannot be tolerated because of its non-linear effect on amplifier phase shift. If clipping of the unused portion of the output waveform is to be employed, it must be precise and symmetrical clipping accomplished in such a manner that the direct-current level of the output waveform does not vary. This is due to the fact that a non-symmetrical output waveform would contain a direct-current component which could vary in amplitude with each successive output waveform and thereby introduce a new element of error or phase shift. This precise clipping is obtained by the provision of a second feedback path comprising capacitor 18, resistor 22, and the avalanche diode 20.

Before any input signal is applied capacitor 18 is charged to a potential which is equal to the direct-current voltage difference between the two ends of the $\beta$ network (collector of transistor 14 and base of transistor 10) and which, as will be seen, is not critical. As is indicated in FIG. 1, capacitor 18 is charged in a direction which is the forward conducting direction of diode 20. Thus initially, positive half cycles of the output waveform are readily conducted by the feedback path containing capacitor 18, diode 20 and resistor 22 while negative half cycles of the output waveform are not readily conducted by the feedback path until an amplitude is reached which will be of such a magnitude as to cause diode 20 to be in its breakdown region of reverse conduction. As has been mentioned, the discharge time of capacitor 18 is at least several times greater than the period of the input waveform and, therefore, the capacitor cannot completely discharge in a single period of the output waveform. Consequently, with each succeeding period of the output waveform, the charge on capacitor 18 builds up. As the charge on capacitor 18 begins to build up, diode 20 begins to permit a smaller and smaller portion of the positive half cycle of the output waveform to pass and a larger and larger portion of the negative half cycle of the output waveform to pass. When equilibrium is reached, the voltage on capacitor 18 is just equal to half of the diode avalanche breakdown voltage. Feedback through the path comprising diode 20 and capacitor 18 is symmetrical on both positive and negative excursions of the output waveform and is not dependent upon the magnitude of the direct-current voltage which is initially found on capacitor 18 and which has been mentioned above. Also changes in the characteristics of diode 20, itself, will not appreciably affect the above-mentioned process.

As has been stated, after steady state has been reached and when the instantaneous output voltage exceeds one-half of the breakdown potential of avalanche diode 20, the diode is in the conducting state. The conduction resistance of diode 20 may be neglected compared to the size of series resistor 22. Thus, the feedback due to this conditional path is now determined by series resistor 22 (capacitor 18 is of relatively large capacitance and acts like an alternating-current short circuit). At low instantaneous output amplitudes diode 20 is in the non-conducting reverse biased state and, therefore, the feedback path of which it forms a part is essentially an open circuit (greater than 1000 megohms in this case). Capacitor 28 is provided in the output to isolate the alternating-current output circuit from the amplifier in order that the direct-current operating level of the last stage comprising transistor 14 shall have no effect on the output signal at terminals 24, 26.

The solid curve of FIG. 2 is an illustration of the steady-state output waveform as seen at terminals 24, 26. The dotted lines indicate what the output waveform would tend to be but for the feedback path including resistor 22, diode 20 and capacitor 18. It can be seen in FIG. 2 that the low amplitude gain as determined by the three stages of amplification and the feedback loop comprising resistor 16 would produce a very high amplitude wave, which is here illustrated by the dotted lines as having a swing of 140 volts peak to peak. Since no readily available transistor is capable of performing this task, it is obvious that clipping and possible destruction of the transistors would occur due to the limitations of the amplifier itself. This would result, at best, in the unwanted non-linear phase shift before-mentioned. Therefore, the addition of the conditional feedback circuit comprising capacitor 18, resistor 22, and avalanche diode 20 provides the necessary symmetrical clipping. After steady state has been reached and as the breakdown potential of diode 20 is reached in the negative direction the conditional feedback path is effectively switched in. This reduces the over-all gain at that point and clipping of a sort occurs. This is not a straight cut-off but a very large reduction in gain over that portion of the output waveform during which the conditional feedback path is effectively switched in, giving substantially the same result insofar as the critical portion of the wave is concerned. The output waveform continues in the reduced gain portion until the voltage across diode 20 falls below the negative breakdown voltage of diode 20. The conditional path is then effectively cut out and the output waveform is again in the relatively high gain portion. This continues until the voltage across diode 20 goes positive, or in the direction of continued low resistance, where the conditional path is again switched in, so to speak, and the amplifier is again in its low gain region.

There is an obvious advantage in using the above-described method of effectively clipping the output waveform by abruptly reducing the gain over outright clipping of the output waveform by any of many known methods, namely that all the stages of the amplifier are affected by the reduction in over-all gain, while in outright clipping of the output waveform only the last stage is affected. One, of course, immediately recognizes that the applicant's described arrangement prevents the overloading of any and all stages of the amplifier while the clipping of the output waveform only protects the last stage.

What is claimed is:

A nonlinear amplifier comprising at least one stage of symmetrical amplification having an input circuit and an output circuit, a feedback circuit including a diode having a low impedance forward conduction characteristic, a high impedance reverse conduction characteristic below a critical voltage value, and a low impedance reverse conduction characteristic above said critical voltage value connected in series with a capacitor between said input circuit and said output circuit, and a source of continuous alternating current signals connected to said input circuit, said capacitor having a discharge time of at least several times greater than the minimum period of said input signal whereby after steady state has been reached said feedback circuit feeds back to said input circuit a portion of the signal from said output circuit for durations of the cycle of said output signal in both polarities that exceed the same predetermined magnitude.

References Cited in the file of this patent

UNITED STATES PATENTS

| | | |
|---|---|---|
| 2,683,806 | Moody | July 13, 1954 |
| 2,787,712 | Priebe | Apr. 2, 1957 |
| 2,789,164 | Stanley | Apr. 16, 1957 |
| 2,819,442 | Goodrich | Jan. 7, 1958 |

OTHER REFERENCES

"Analogue Methods in Computation and Simulation" by Soroka, McGraw-Hill, 1954, page 205 relied on.

Gittleman: "Transistor and Diodes Stabilize A.-C. Servos," Electronics, October 1956, pages 174–175.